June 11, 1968  T. E. CURTIS ET AL  3,388,297
AUTOMATIC SECTIONALIZING OF ELECTRIC POWER DISTRIBUTION SYSTEMS
Filed Aug. 6, 1965
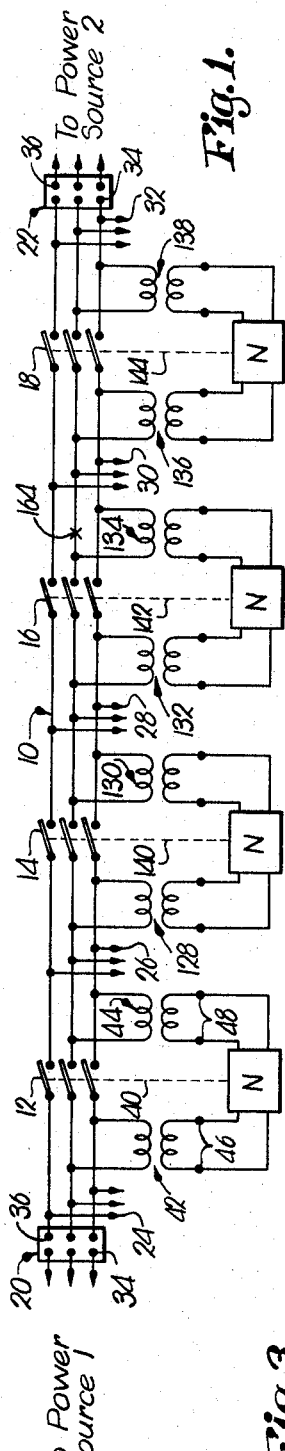
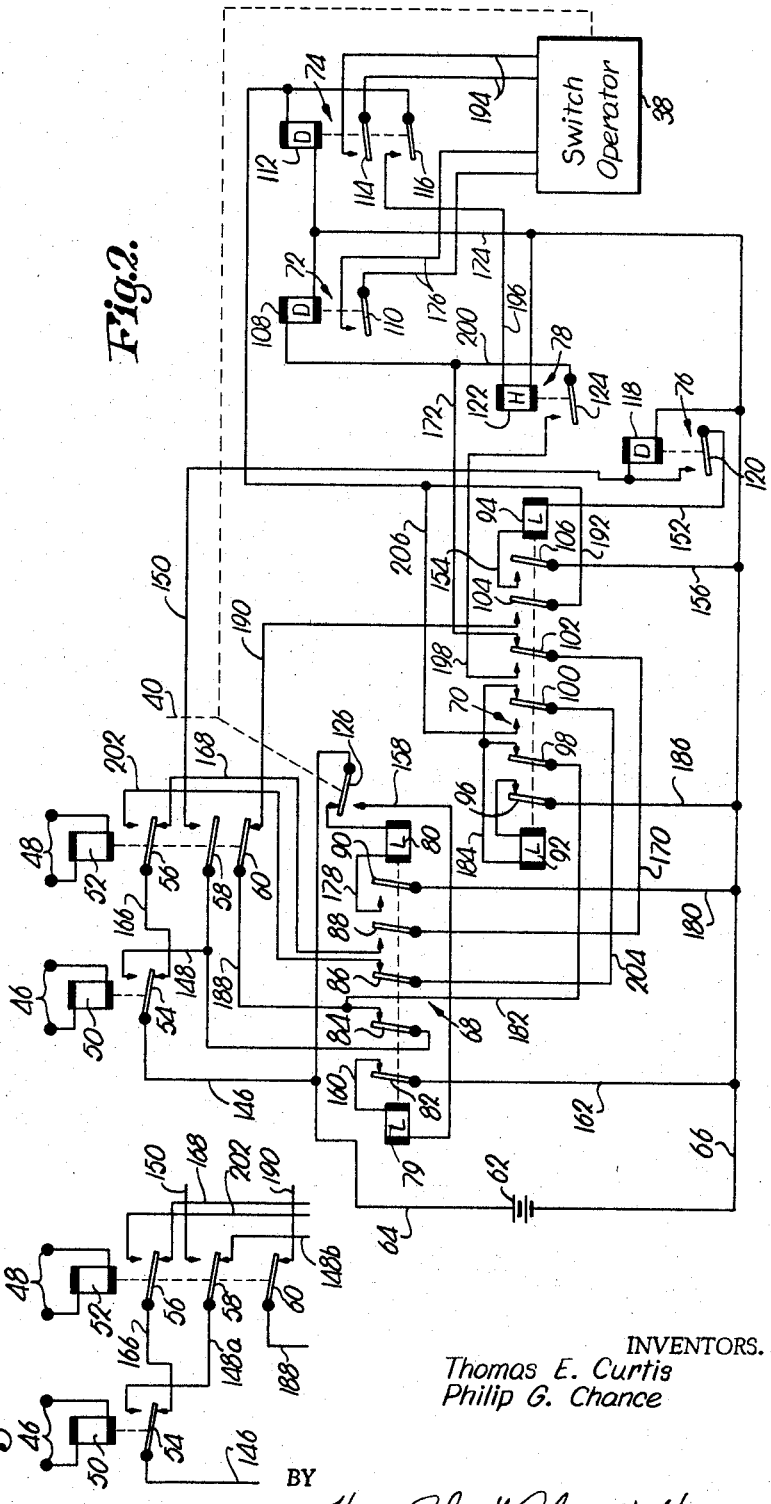
INVENTORS.
Thomas E. Curtis
Philip G. Chance
BY
Hovey, Schmidt, Johnson + Novey
ATTORNEYS.

United States Patent Office 3,388,297
Patented June 11, 1968

3,388,297
AUTOMATIC SECTIONALIZING OF ELECTRIC POWER DISTRIBUTION SYSTEMS
Thomas E. Curtis and Philip G. Chance, Centralia, Mo., assignors to A. B. Chance Company, Centralia, Mo., a corporation of Missouri
Filed Aug. 6, 1965, Ser. No. 477,796
8 Claims. (Cl. 317—24)

ABSTRACT OF THE DISCLOSURE

Automatic sectionalizing apparatus is employed in a power distribution system to simultaneously open the sectionalizing switches of the system in response to the occurrence of a fault, sequentially reclose the switches beginning at the power stations and advancing toward the fault, and then reopen the switch or switches associated with the faulted section to isolate the latter from the line.

---

This invention is primarily for use with electrical power distribution systems, and relates to apparatus for automatically isolating a faulted section of a power transmission line so that service to all loads not coupled with the faulted section may be maintained.

Although it is estimated that more than eighty percent of the faults which occur on power transmission lines are transitory, in most instances where the fault is of a sustained nature requiring corrective action it is desirable to provide some means of temporarily isolating the faulted section of the transmission line so that service may be restored to the other sections thereof until repair of the fault can be made. The instant invention, therefore, is directed to means for automatically executing this function without the necessity of, and time delay, incident to the manual operation of sectionalizing switches to isolate the faulted section.

A fault or overload condition of a permanent nature may be caused by disturbances such as transmission line windwhip, falling trees resulting from windstorms, which cause a sustained line-to-line contact or break the line and cause a direct short to ground, or icing of the lines of sufficient severity to cause breakage. Manifestly, any such short of sustained nature requires that the portion of the faulted line requiring repair be isolated from the power source. The faster this can be achieved, the sooner service may be restored to loads supplied by other sections of the line which are, of course, also adversely affected by the fault until sectionalizing is accomplished.

It is, therefore, the primary object of this invention to provide apparatus for automatically sectionalizing a power transmission line to effect isolation of a section having an overload fault therein.

A specific object of the instant invention is to provide apparatus which is coupled with the line switches of a power transmission line for automatically opening the switches upon occurrence of a fault condition, and for subsequently ultimately reclosing only the switches associated with the unfaulted sections of the line.

An additional object of this invention is to provide a sectionalizing scheme as aforesaid which sequentially recloses the line switches after opening the latter until the switch or switches associated with the faulted section are closed, and which thereupon reopens only the last-mentioned switch or switches to thereby isolate the faulted section from the remainder of the transmission line in a minimum of time.

A further object of the invention is to provide such a sectionalizing scheme wherein each line switch location is provided with independently operable means for opening and closing the switch in response to sensing of line potential at that particular switch location without regard to line conditions at other locations.

Still another object of the instant invention is to provide an automatic sectionalizing system wherein sequential closing of the line switches that are opened in response to a fault condition is effected in two directions, commencing with open switches on both sides of the fault and progressing toward the fault until the two line switches of the faulted section are closed, and whereupon sequential operation of the line switches then ceases and only the two switches of the faulted section are reopened to isolate the faulted section, whereby service to consumers supplied by other sections of the line is interrupted for only a minimum time.

Yet another object of this invention is to provide a sectionalizing scheme as aforesaid which is arranged such that the sectionalizing line switches are never required to break a load-supplying circuit; thus, the problem of switch damage due to arcing at the time of load interruption is avoided.

Other objects will become apparent as the detailed description proceeds.

In the drawing:

FIGURE 1 is an electrical schematic diagram showing the connection of the apparatus of the instant invention with a supply loop of a power transmission line;

FIG. 2 is an electrical schematic diagram showing the control network for a closed loop distribution system which is operably associated with each of the line switches, respectively; and FIG. 3 is a fragmentary schematic diagram showing a modification of the circuitry of FIG. 2 which adapts the control network for utilization with an open loop distribution system.

FIGURE 1 schematically illustrates the supply loop of a high voltage power line commonly utilized for the transmission of 3-phase electrical energy. The numeral 10 designates the three conductor main line having four line switches 12, 14, 16 and 18 interposed in series therewith. A pair of power circuit breakers 20 and 22 are operably coupled with respective ends of the supply loop in series with line 10, the latter extending from each of the breakers to a power source (not shown) as indicated. Thus, the outputs of the two power sources are electrically coupled in parallel with one another via main line 10.

It will be appreciated that the circuit breakers 20 and 22 and the line switches 12–18 divide main line 10 into five sections defined by breaker 20 and switch 12, switches 12 and 14, switches 14 and 16, switches 16 and 18, and switch 18 and breaker 22. The section bounded by breaker 20 and switch 12 is coupled with a 3-conductor tap line 24, the remaining sections from left-to-right being coupled with tap lines 26, 28, 30 and 32, respectively. Each of the tap lines 24–32 supplies a particular power consuming load.

Each of the circuit breakers 20 and 22 has two sets of three terminals 34 and 36 which are interposed in series with the three conductors of line 10. Thus, the internal mechanism of each breaker controls the electrical continuity of line 10 in response to overload conditions as is conventional in the art. The breakers utilized herein are of conventional design and preferably of the reclosing type which are automatically controlled by over-current relays and timing means (not shown) whereby, when a sustained fault occurs on the line, the breakers open and reclose a selected number of times, e.g., three times before opening a fourth time and locking out. Since breakers of this type comprise conventional and well-known equipment, a detailed description thereof will not be presented in this specification. However, in order to meet the requirements of the automatic sectionalizing scheme to be fully set forth hereinafter, the reclosing relay may be set so that the first reclosure occurs substantially immediately after initial tripping of the breaker upon occurrence of a fault in the line. This first, rapid reclosure is provided so that service will not be interrupted for any substantial length of time if the fault is of a transitory nature and hence self-rectifying. However, if the fault is not of a transitory nature, reopening of the breaker to interrupt the electrical continuity between its terminal sets 34 and 36 will occur, and the reclosing relay may be set so that the second reclosure occurs 60 seconds thereafter. Continued presence of the fault will cause the breaker to trip a third time, and the third reclosure may be effected 60 seconds after this third trip. It is desired that the fourth trip, if encountered, lock the breaker open until subsequent resetting. The significance of this operating sequence will be fully appreciated hereinafter when the description of the apparatus is set forth in detail, it being understood that the reclosure delay time set forth above is purely exemplary and may be set as needed depending upon the particular system response desired.

Four control networks designated N are shown in FIG. 1 operably coupled with respective line switches 12, 14, 16 and 18 for opening and closing the latter. It should be understood that the four networks are all substantially identical but operate entirely independently from one another.

One of the networks N for use with a closed loop distribution system is shown in detail in FIG. 2 and is depicted as operating line switch 12, such operation being effected by switch operator 38 through mechanical linkage 40 illustrated diagrammatically in FIGS. 1 and 2. The switch operator 38 is conventional motor driven apparatus commonly used to open and close suitable switches mounted on transmission line poles or towers. For example, operator 38 may comprise a series motor driving a hydraulic pump connected to an operating cylinder through hydraulic fluid lines, the direction of fluid flow being controlled by solenoid valves.

A pair of step-down potential transformers 42 and 44 have their primary windings connected to main line 10 on opposite sides of switch 12. Thus, it may be seen (FIG. 1) that transformer 42 senses the presence of electrical potential adjacent switch 12 in the section of line 10 between breaker 20 and switch 12, while transformer 44 senses the presence of electrical potential adjacent switch 12 in the section of line 10 between switch 12 and switch 14. The actual physical connection of the primaries of the transformers to line 10 is preferably made near the connection terminals of switch 12.

The secondary winding of transformer 42 is connected between a pair of terminals 46, the secondary of transformer 44 being coupled with a pair of terminals 48. Referring to FIG. 2, it may be seen that terminals 46 and 48 are coupled with coils 50 and 52, respectively, of a pair of electro-mechanical relays. Coil 50 has associated therewith a relay switch 54, while coil 52 is operably coupled with three relay switches 56, 58 and 60. Both of these relays are shown with their coils 50 and 52 deenergized.

The control network of FIG. 2 may be powered by a battery such as 62 having a positive bus 64 and a negative bus 66. The components of the control network include a latch relay 68, a latch relay 70, time delay relays 72, 74 and 76, and a holding relay 78.

Latch relay 68 is provided with a pair of relay coils 79 and 80 which are mechanically coupled to five relay switches 82, 84, 86, 88 and 90. Latch relay 70 comprises a pair of relay coils 92 and 94 which are mechanically coupled with six relay switches 96, 98, 100, 102, 104 and 106. The latch relays are shown with their coils de-energized and with the switches thereof latched in the right-hand position, which is the position assumed following energization of coils 80 and 94. It will be appreciated when the operation of the circuitry is described hereinafter, that the interconnection of the coils of the latch relays and the switches thereof is such that a momentary pulse to a particular coil will shift the movable poles of the associated switches toward that coil and then de-energize the latter, leaving the switches latched.

The delay relays 72, 74 and 76 may conveniently be conventional pneumatic relays of the slow-to-operate type. Relay 72 comprises a relay coil 108 operably coupled with a relay switch 110 and is shown with coil 108 de-energized. Relay 72 may be set to have a delay time of ten seconds, i.e., switch 110 is closed ten seconds after energization of coil 108. This relay, as well as the other time delay relays 74 and 76, resets instantaneously upon de-energization thereof.

Relay 74 is provided with a coil 112 and a pair of relay switches 114 and 116. This relay is also shown de-energized and may have a delay time of ten seconds. Relay 76 comprises a relay coil 118 operably coupled with a relay switch 120. Relay 76 is illustrated with its coil 118 de-energized and may have a delay time of 200 seconds.

The holding relay 78 is also a conventional pneumatic relay but is of the slow-to-release type. This relay has a coil 122 coupled with a switch 124 and may be provided with a 15 second holding time period, i.e., relay switch 124 is reopened (returned to the position shown) 15 seconds following de-energization of relay coil 122. It is to be understood that the specific times set forth herein are typical only and may be varied as required or desired for a particular installation.

A single-pole, double-throw auxiliary switch 126 has its hinge contact or movable pole electrically connected with bus 64 and mechanically coupled with linkage 40 for actuation thereby in response to operation of line switch 12. More specifically, switch 126 is shown in engagement with its upper fixed contact, which is in the position of the switch when main switch 12 is open. When the switch operator 38 effects closure of main switch 12, the movable pole of auxiliary switch 126 moves into engagement with the lower fixed contact thereof in response to shifting of linkage 40. The interconnection of auxiliary switch 126 with linkage 40 is such that the movable pole thereof engages the upper contact only upon complete opening of switch 12 and engages the lower contact only upon complete closing of switch 12.

The three other control networks identical to the network shown in FIG. 2 are coupled with respective line switches 14, 16 and 18 by step-down potential transformers 128 and 130, 132 and 134, and 136 and 138. Operating linkages 140, 142 and 144 are employed to control corresponding switches 14, 16 and 18. Thus, for example, if the network shown in FIG. 2 were to be utilized to control switch 14, relay coils 50 and 52 would be coupled with the secondary windings of transformers 128 and 130, respectively, auxiliary switch 126 would be operably coupled with linkage 140, and switch operator 38 would be connected with linkage 140 for driving the latter to open and close switch 14.

It should be noted that, since the control network associated with each line switch will be located at the site of the transmission line pole or tower carrying the line switch, battery 62 is provided so that operation of the network will not be dependent upon power obtained from main line 10. In the description of the operation to follow, it will be appreciated that utilization of an independent power source for the control network is important during the automatic sectionalizing sequence.

Referring now to FIG. 3, the modification of the circuitry of FIG. 2 there shown adapts control network N for use with open loop distribution systems. The significance of this modification will become apparent when the operation of the circuitry is discussed hereinafter; however, at this juncture it should be noted that in FIG. 3 switch 58 is shown having an additional, lower fixed contact which is engaged by the movable pole of the switch when relay coil 52 is de-enerigzed.

Operation

In a closed loop distribution system, under normal conditions with main line 10 in operation, breakers 20 and 22 and line switches 12–18 are closed, thereby connecting the two sources in parallel so that the same jointly supply power to the five secondary lines 24–32. Thus, relay coils 50 and 52 of the four control networks will be energized, and the auxiliary switch 126 of the four networks will be shifted from the position shown into engagement with its lower contact.

Since relay coils 50 and 52 are energized, the following electrical circuit exists to the coil 118 of relay 76: from bus 64 along lead 146 to switch 54 in engagement with its upper contact, along lead 148 to the now closed switch 58, along lead 150 which forms a control connection to coil 118, and thence to the negative bus 66. Thus, switch 120 will be closed and has delivered a standby command along lead 152 to relay coil 94. Therefore, the switches of latch relay 70 will be latched in the positions shown, and the switches of latch relay 68 will be latched in their left-hand positions (switches 82, 84 and 86 open, and switches 88 and 90 closed).

It will be appreciated that the switches of latch relay 70 are in the positions shown under normal operation of main line 10 because, at the outset of line operation, switch 120 closed 200 seconds after energization of coil 118, thereby creating the following electrical circuit to coil 94 if the switches of latch relay 70 were latched in their left-hand positions: from lead 150 through the now closed switch 120, along lead 152 to relay coil 94, along lead 154 through switch 106, and thence along lead 156 to the negative bus 66. In shifting the switches of latch relay 70 to the right-hand positions shown, it may be noted that switch 106 opened to break the power circuit to coil 94, thereby leaving relay 70 in condition for subsequent operation upon energization of the other coil 92.

Latch relay 68 was similarly operated at the outset of main line operation. With auxiliary switch 126 closed against its lower contact, the following electrical circuit existed if the switches of relay 68 were latched in their right-hand positions: from positive bus 64 through switch 126, along lead 158 to relay coil 79, along lead 160 through switch 82, and thence along lead 162 to the negative bus 66. This, of course, caused the switches of latch relay 68 to latch in their left-hand positions, and also broke the power circuit to coil 79 leaving relay 68 in condition for subsequent operation upon energization of coil 80.

Assuming that a fault of a nontransitory nature occurs at 164 (FIG. 1), breakers 20 and 22 trip and then instantaneously reclose. This has no effect on the four control networks even if reclosure is not entirely instantaneous, since insufficient time is available for network response. However, breakers 20 and 22 then immediately trip the second time since fault 164 persists.

As set forth earlier in the specification, breakers 20 and 22 remain open for 60 seconds following the second trip thereof. During this period, the four control networks simultaneously open their associated line switches 12–18. This is initiated by the de-energizing of relay coils 50 and 52 due to interruption of current flow in main line 10 by the action of the circuit breakers 20 and 22. This creates the following electrical circuit: from bus 64 along lead 146 to switch 54, along lead 166 to switch 56, along lead 168 through switch 88, along lead 170 through switch 102, along lead 172 which forms a control connection to relay coil 108, and thence to the negative bus 66 via lead 174. This effects closure of switch 110 after the ten second delay of relay 72, thereby closing a control circuit to switch operator 38 comprising lead pair 176. Assuming that operator 38 is of the hydraulic type described hereinabove, leads 176 would control the energization of a solenoid valve which operates a hydraulic cylinder to, in turn, actuate linkage 40 to thereby open switch 12.

Assuming that operator 38 utilizes 3 seconds in shifting switch 12 to the completely open position, at the end of this 3 second period auxiliary switch 126 closes against its upper contact, thereby creating the following circuit: from bus 64 through switch 126 to relay coil 80, along lead 178 to switch 90, and thence along lead 180 to the negative bus 66. This energizes coil 80 and causes the switches of latch relay 68 to be latched in the right-hand position shown. Additionally, it will be appreciated that switch 90 is opened to de-energize coil 80 and condition relay 68 for sebsequent operation upon energization of coil 79. Since switch 88 is also opened, coil 108 is deenergized, thereby breaking leads 176 by the opening of switch 110. Furthermore, it may be noted that relay coil 118 is de-energized by virtue of prior opening of switch 84.

Since the action just described of opening switch 12 occurs in the three other control networks to simultaneously open switches 14–18, the second reclosure of breakers 20 and 22 will not result in the application of power to line 10 between switch 12 and switch 18. However, transformers 42 and 138 will sense the presence of electrical potential and cause the two networks associated with switches 12 and 18 to operate in a manner to effect closure of these two switches. Before proceeding with a description of the exact manner in which this is effected, it should be understood that the apparatus will now sequentially close the line switches in succession beginning with switches 12 and 18 at the ends of the supply loop. It will be seen however, that such sequential switch closing, commencing with switch 18, will be blocked by the presence of fault 164, but that sequential closing commencing with switch 12 will proceed to switches 14 and 16 before the apparatus operates to isolate the section containing fault 164.

Looking now at the operation of the network associated with switch 12 at the time of the second reclosure of breaker 20, relay coil 50 is energized by such reclosure to create the following electrical circuit: from bus 64 along lead 146 to switch 54, along lead 148 to switch 84, along lead 182 to switch 98, and thence along lead 184 to coil 92 and switch 96 to the negative bus 66 via lead 186. This excitation delivered along lead 184 comprises a locate command which energizes coil 92 to latch the switches of latch relay 70 in the left-hand position, whereupon switch 96 is opened to break the power circuit to coil 92 and condition relay 70 for subsequent operation upon energization of coil 94. The purpose of the locate command is to condition the apparatus to look for a fault, as will become clear hereinafter when the action of holding relay 78 is discussed.

The latching of the switches of relay 70 in the left-hand position enables relay coil 112 to be energized by the following circuit: from lead 148 to switch 84, along lead 188 to switch 60, along lead 190 to switch 104, along lead 192 which forms a control connection to relay coil 112, and thence to the negative bus 66 via lead 174. After the ten second delay of relay 74, switch 114 closes to close a control circuit to switch operator 38 via lead pair 194. This actuates a solenoid valve to operate the above-mentioned hydraulic mechanism of operator 38 in the opposite direction by a reversal of fluid flow, thereby actuating linkage 40 to return line switch 12 to the closed position. Then, after the 3 seconds have elapsed, during which time operator 38 was completing the closure of switch 12, auxiliary switch 126 closes against its lower contact to energize relay coil 79 via the circuit set forth at the outset of the operational description of this specification, thereby latching the switches of latch relay 68 in the left-hand position.

Additionally, closure of main switch 12 applies electrical potential to transformer 44 to thereby energize relay coil 52 to break the power circuit to relay coil 112 by opening switch 60. Simultaneously, switch 58 is closed to energize relay coil 118 and commence the 200 second time-out period of relay 76. When this relay times out, switch 120 closes to reset the switches of latch relay 70 in the right-hand, latched position so that the network now resumes its initial condition with line 10 in normal operation.

Prior to the close of the 200 second time delay period of relay 76, however, it will be appreciated that the switches of relay 70 remain latched in their left-hand positions. Thus, subsequent interruptions of main line 10 due to tripping of the breakers will not effect a reopening of line switch 12 since switch 102 of latch relay 70 is in engagement with its left-hand contact and thus will not complete a power circuit along lead 172 to relay coil 108 upon de-energization of relay coils 50 and 52.

When line switch 12 is reclosed, power is made available to transformer 128, whereupon the network associated with line switch 14 undergoes the same sequential switching operation as described above for the reclosure of switch 12. Thus, when switch 14 is closed, power is made available to transformer 132 and the control network associated with switch 16 is operated in like manner until the time of actual reclosure of switch 16. It will be appreciated that switch 16 closes directly into fault 164 and that, therefore, breaker 20 will again sense the overload condition and trip for the third time.

As discussed above, the third tripping of the breaker will not affect the two control networks associated with line switches 12 and 14; therefore, these two switches remain closed. However, considering the operation of the control network associated with switch 16, it may be seen that when coil 50 (coupled with the secondary of transformer 132) is de-energized by the tripping of breaker 20, switch 54 returns to its normal position as shown in engagement with its lower contact thereby breaking the power circuit to relay coil 112. Auxiliary switch 126 is in engagement with its lower contact due to the closure of switch 16; thus auxiliary switch 126 energizes relay coil 79 to latch the switches of relay 68 in the left-hand position. This also interrupts the path of normal current feed to relay coil 112 by opening switch 84. However, prior to this time, switch 116 had been held closed by relay coil 112 to, in turn, energize relay coil 122 of holding relay 78 via lead 196. Since relay 78, however, holds switch 124 thereof closed for 15 seconds following de-energization of coil 122, a current path is made available to relay coil 108 to reopen switch 16 by the following circuit: from bus 64 along lead 146 to switch 54, along lead 166 to switch 56, along lead 168 to switch 88, along lead 170 to switch 102, along lead 198 which forms a control connection and extends to switch 124, and thence along lead 200 to relay coil 108. With the holding time for relay 78 of 15 seconds and a delay time for relay 72 of 10 seconds, it may be seen that switch 110 will close prior to the opening of switch 124 and effect operation of switch operator 38 for a sufficient period of time to effect complete reopening of switch 16.

When switch 16 opens, auxiliary switch 126 is closed against its upper contact to thereby energize relay coil 80 and latch the switches of relay 68 in their right-hand positions. It should be noted that relay coil 118 will not be energized and hence latch relay 70 will not be reset since no power circuit will be available to relay coil 118 upon reclosing of breaker 20 after the second 60 second period, because only relay coil 50 will be energized. Thus, the switches of relay 68 remain latched in their right-hand positions, while the switches of relay 70 remain latched in their left-hand positions—the opposite of the normal network condition when main line 10 is operating properly with no fault.

The network associated with switch 18 operates in an analogous manner to that as described for switch 16. The two differences between the operation of the two networks are that, first, the network associated with switch 18 is under the control of breaker 22 and, secondly, relay coil 52 of this network rather than coil 50, is energized when sequential reclosing of the line switches commences. The operation is otherwise identical, except that now the switch 86 and its associated leads 202 and 204, and switch 100 (coupled with lead 204) and its associated lead 206 (which forms a control connection and extends to lead 192) are now utilized to form the power circuit to relay coil 112 instead of the circuit described through switches 84, 60 and 104.

It is apparent that the fault may occur in any of the five sections of the line with the operation of the various networks being analogous to that as described above for a fault appearing at 164. Basically, it is to be remembered that the sequential reclosing of the line switches commences with switches 12 and 18 and advances toward the center of the supply loop until the faulted section is found. If, for instance, the fault should occur between breaker 20 and switch 12, or between switch 18 and breaker 22, the breaker adjacent the fault will lockout and sequential reclosing of the line switches will be effected in one direction of advancement only. In any event, the faulted section will ultimately be isolated by opening of the two line switches (or the line switch and the breaker) bounding that section. Thus, in the example set forth herein, service is reestablished to the secondary lines 24, 26, 28 and 32 of the unfaulted sections with a minimum of delay. Manifestly, the system is utilizable with any number of sectionalizing switches and load taps.

The foregoing discusson of the operation of the system assumes that it is desired to operate line 10 and switches 12–18 as part of a closed loop power distribution system. In many instances, however, open loop operation is desired, i.e., one of the sectionalizing line switches 12–18 is operated normally open so that line 10 is effectively electrically split into a pair of supplying segments. Thus, in an open loop system, the two power sources are not connected in parallel but separately supply their respective loads.

The advantages offered by open loop operation include the following:

(1) The outputs of the power sources need not be in phase synchronization since the sources are not electrically interconnected; therefore, some degree of simplification in power generation is realized.

(2) Fault currents are limited in magnitude to the current that may be drawn from one power source; therefore, the danger of damaging overload of the sectionalizing switches is reduced.

(3) When transient faults occur, all of the loads coupled with the secondary lines are not exposed to the fault current. (However, the same exposure as obtained with a closed loop system occurs during the isolation of permanent faults by the automatic sectionalizing equipment.)

In comparing FIG. 3 with FIG. 2, it may be seen that lead 148 is not directly connected to switch 84 in FIG. 3, but is divided into a pair of conductors 148a and 148b, the latter being connected to the additional, lower fixed contact of switch 58. Conductor 148b then connects this contact with the movable pole of switch 84. The effect of this modification is to render it impossible to energize relay coil 112 if electrical potential is available at both of the pairs of potential sensing terminals 46 and 48. Thus, the two power sources cannot be paralleled by operation of the automatic sectionalizing system since, if electrical potential is applied to both sides of any sectionalizing switch, both of the relay coils 50 and 52 of the network N associated with that switch will be energized, resulting in shifting of the movable pole of switch 58 into engagement with its upper contact to thereby break the electrical continuity that exists between conductors 148a and 148b when coil 52 is deenergized.

Except for the fact that the line switches will not close by operation of the automatic sectionalizing apparatus when power is applied to both sides thereof, the various control networks of the apparatus operate in identically the same manner as discussed above for the closed loop supply system. It is manifest, however, that for proper operation with an open loop system, the timing sequences of the breakers 20 and 22 as well as the time delay and holding relays of the networks N must be correlated to prevent two adjacent line switches from closing simultaneously. This is necessary in order to preclude paralleling of the power sources and, additionally, to preclude the possibility of false sensing of a fault. The exemplary breaker and relay times set forth in this specification are equally applicable in the utilization of the apparatus with both open and closed loop distribution systems.

To briefly illustrate the operation of the apparatus with an open loop system, it is assumed that line switch 12 is operated in the normally open condition. When a permanent fault occurs at 164, breaker 22 opens, instantaneously recloses, and then opens the second time followed by the simultaneous opening of the normally closed line switches 14, 16 and 18. Reclosure of breaker 22 applies potential to transformer 138 to thereby initiate reclosure of switch 18. Since switch 18 closes into the fault, breaker 22 again opens followed by opening of switch 18 which then remains in the open condition.

Meanwhile, when breaker 22 opened for the second time (remaining open for the first 60 second period) potential was removed from transformer 44. Therefore, closing of the normally open switch 12 was initiated by its associated network N since electrical potential was then available at only one side of switch 12 rather than both sides. Switches 14 and 16 then close in succession after closeure of switch 12. Since switch 16 closes into fault 164, this switch is subsequently reopened during the first 60 second opening of breaker 20. The final result of sectionalizing, therefore, is identical to the results that would be obtained if the apparatus were employed with a closed loop system, since switches 16 and 18 remain open to isolate the faulted section while the other switches and breakers are closed to supply power to secondary lines 24, 26, 28 and 32.

In both the open and closed loop systems, the sectionalizing switches are returned to their normal positions manually at the switch location after the fault condition has been corrected. This restores the sectionalizing apparatus to normal and conditions the same for subsequent operation if another fault should occur at a later time. It should also be understood that the sectionalizing apparatus will respond to multiple faults and isolate the several faulted sections in the event that a number of faults should occur before line crews can correct the fault condition.

Having thus described the invention, what is claimed as new and desired to be secured by Letters Patent is:

1. In a power distribution system having a source of electrical energy, a main transmission line for coupling said source with a number of secondary lines, and a plurality of normally closed switches interposed in said main line and dividing the latter into a number of sections associated with respective secondary lines, apparatus for automatically operating said switches to isolate a section having a fault therein comprising:

a circuit breaker having a pair of terminal structures and means normally maintaining electrical continuity between said structures but operable in response to an overload condition to interrupt said continuity and subsequently re-establish the same after a predetermined period of time, and again interrupt said continuity if said condition persists and subsequently re-establish said continuity after a preselected time interval;

means for coupling terminal structures in series with said main line between said source and said secondary lines, whereby said breaker operates in response to said fault;

mechanism adapted for coupling with each of said switches, respectively, for opening and closing the latter;

control networks coupled with respective mechanisms for automatically operating the latter to open said switches in response to the first of said continuity interruptions;

means for electrically coupling each of said networks with the corresponding switch at a point on the main line between the switch and said source, each of said networks including means for detecting application of electrical potential by said source to its associated switch, and means for operating the corresponding mechanism to close the last-mentioned switch in response to such detection, whereby the switches are closed in succession, commencing with the switch nearest the breaker upon said continuity re-establishment after said predetermined time period, until the switch adjacent the fault is closed to thereby cause said breaker to effect the second of said continuity interruptions.

each of said networks further including means for operating the corresponding mechanism to reopen its associated switch in response to said second interruption when the last-mentioned switch is the switch adjacent the fault, whereby the faulted section will be isolated from the source when said breaker re-establishes said continuity after said preselected time interval, each of said networks being provided with switching means for conditioning the network for subsequent closure of the associated main line switch upon opening of the latter in response to said first continuity interruption; and means for mechanically coupling each of said main line switches, respectively, with a corresponding switching means, whereby each main line switch and its associated switching means operate in unison.

2. In an open loop power distribution system having a pair of electrical energy sources, a main transmission line coupled with said sources and extending therebetween, a number of secondary lines coupled with said main line at junctions therealong, and a plurality of switches interposed in said main line between adjacent secondary lines to divide the main line into a number of sections associated with respective secondary lines, one of said switches being normally open while the remaining switches are normally closed, thereby splitting the main line into two separate supply segments, apparatus for automatically operating said switches to isolate a section having a fualt therein comprising:

structure adapted for coupling with said switches for selectively opening and closing each of said switches;

means adapted for coupling with said line for sensing the occurrence of said fault; and means operably associated with said sensing means, responsive to detection of said fault thereby, and coupled with said structure for automatically operating the latter to open the normally closed switches of the line segment containing said fault, subsequently sequentially close the open switches on both sides of the fault, commencing with said normally open switch and the switch adjacent the source supplying said fault-containing line segment and progressing in succession until the two switches of the faulted section are closed, and then reopen said two switches while maintaining the remaining switches in the closed condition to thereby isolate the faulted section from the sources.

3. The invention of claim 2, wherein said operating means includes a control network for each of said switches, respectively, coupled with said structure and means for electrically coupling said sections with said networks to initiate operation of the latter to effect said successive switch closing in response to application of electrical potential to successive sections by said sources as the switches on both sides of the fault are successively closed.

4. The invention of claim 3, wherein each of said networks includes means preventing operation of the structure to close the corresponding switch when electrical potential is applied to the latter by both of said sources, whereby to preclude closure of said normally open switch during normal operation of the system and render any of said switches capable of normally open operation if desired.

5. In an open loop power distribution system having a pair of electrical energy sources, a main transmission line coupled with said sources and extending therebetween, a number of secondary lines coupled with said main line at junctions therealong, and a plurality of switches interposed in said main line between adjacent secondary lines to divide the main line into a number of sections associated with respective secondary lines, one of said switches being normally open while the remaining switches are normally closed, thereby splitting the main line into two separate supply segments, apparatus for automatically operating said switches to isolate a section having a fault therein comprising:

a pair of circuit breakers, each having a pair of terminal structures and means normally maintaining electrical continuity between said structures but operable in response to an overload condition to interrupt said continuity and subsequently re-establish the same after a predetermined period of time, and again interrupt said continuity if said condition persists and subsequently re-establish said continuity after a preselected time interval;

means for coupling the terminal structures of each of said breakers, respectively, in series with said main line between said secondary lines and a corresponding source, whereby said breakers operate in response to fault currents in respective line segments;

mechanism adapted for coupling with said switches for selectively opening and closing each of said switches;

a control network for each of said switches, respectively, coupled with said mechanism for automatically operating the latter to open the normally closed switches of the line segment containing said fault in response to the first of said continuity interruptions of the associated breaker; and means for electrically coupling adjacent sections with the network associated with the switch common to said adjacent sections, each of said networks including means for detecting application of electrical potential by either of said sources to its associated switch, and means for operating said mechanism to close the last-mentioned switch in response to such detection, said detecting means having means for preventing switch closing operation when electrical potential is applied to its associated switch by both of said sources, whereby the open switches on both sides of the fault are closed in succession, commencing with said normally open switch and the switch nearest the breaker of the fault-containing line segment upon said continuity re-establishment by the last-mentioned breaker after said predetermined time period, until the switches adjacent the fault are closed to thereby cause said last-mentioned breaker to effect the second of said continuity interruptions and the other of said breakers to effect the first continuity interruption thereof, each of said networks further including means responsive to breaker interruption subsequent to said successive switch closing for operating said mechanism to reopen its associated switch when the latter is one of the switches adjacent the fault, whereby the faulted section section is isolated from the sources to permit power to be supplied to the secondary lines of the other sections.

6. In a power distribution system having a source of electrical energy, a main transmission line for coupling said source with a number of secondary lines, a plurality of normally closed switches selectively shiftable to open positions and interposed in said main line to divide the latter into a number of sections associated with respective secondary lines, and a circuit breaker coupled in series with said main line between said source and said secondary lines and operable in response to a fault to interrupt the electrical continuity of the main line and subsequently re-establish said continuity after a predetermined period of time, and again interrupt said continuity if the fault persists and subsequently re-establish said continuity after a preselected time interval, and where automatic sectionalizing means is employed with said system to open the switches in response to the first of said continuity interruptions, to subsequently commence sequential closing of said switches in response to said continuity re-establishment after said predetermined time period, whereby the breaker is caused to effect the second of said continuity interruptions when the switch adjacent the fault is closed, and to reopen said switch adjacent the fault in response to said second interruption to thereby isolate the faulted section from the source when the breaker reestablished said continuity after said preselected time interval, the automatic sectionalizing means including an independent control apparatus for each of said switches respectively, each apparatus including:

first electrically responsive means for sensing potential on one side of the respective switch;

second electrically responsive means for sensing potential on the other side of said switch;

bistate means responsive to the position of said switch; means having a pair of operating conditions and responsive alternatively to a standby command for said switch to remain closed until said breaker responds to said fault or a locate command for said switch to look for said fault;

circuit means coupled with said first and second sensing means, said bistate means, and said command responsive means and having a plurality of control connections, said circuit means being operable to delivery a first control signal along a first of said connections when potential is removed from both of said sides of the switch, the latter is closed, and said command responsive means has responded to said standby command, a second control signal along a second of said connections when potential is removed from both of said sides of the switch, the latter is closed, and said command responsive means has responded to said locate command, a third control signal along a third of said connections when potential is removed from said one side of the switch, potential is present on said other side of the switch, and the latter is open, a fourth control signal along a fourth of said connections when potential is present on said one side of the switch, potential is removed from the other side of said switch, and the latter is open, and a fifth control signal along a fifth of said connections when potential is present on both sides of said switch, the latter is closed, and said command responsive means has responded to said locate command:

mechanism adapted for coupling with said switch for opening and closing the latter; and operating circuitry coupled with said command responsive means, said connections, and said mechanism for actuating the latter to open the switch in response to said first control signal, for actuating the mechanism to reclose the switch in response to either said third control signal or said fourth control signal, for providing said locate command in response to either said third control signal or said fourth control signal to cause said command responsive means to change its operating condition and effect the delivery of said second command signal upon said second interruption of the breaker, for actuating the mechanism to reopen the switch in response to said second control signal if the latter is produced within a predetermined time duration after reclosure of said switch, and for providing said standby command in response to said fifth command signal if the latter is produced but after a predetermined time delay of sufficient length to permit said sequential closing of the switches by the apparatuses and isolation of the faulted section.

7. The invention of claim 6, wherein said circuitry includes first delay means responsive to said first control signal for effecting said actuation of the mechanism to open the switch after a first time delay, and second delay means responsive to either said third or said fourth control signal for effecting said actuation of the mechanism to reclose the switch after a second time delay.

8. The invention of claim 7, wherein said circuitry further includes holding means coupling said first delay means with said second connection in response to either said third or said fourth control signal to render the first delay means responsive to said second control signal to reopen the switch, said holding means maintaining the first delay means coupled with said second connection only for a predetermined holding period terminating after reclosure of the switch and at the end of said predetermined time duration.

References Cited
UNITED STATES PATENTS

| | | | |
|---|---|---|---|
| 2,374,001 | 4/1945 | Derr | 317—24 |
| 2,425,168 | 8/1947 | Wilcox et al. | 317—24 |
| 2,545,987 | 3/1951 | Blackburn | 317—24 |
| 3,214,639 | 10/1965 | Cabanes et al. | 317—24 |

MILTON O. HIRSHFIELD, *Primary Examiner.*

R. V. LUPO, *Assistant Examiner.*